(12) United States Patent
Ishikawa

(10) Patent No.: US 7,064,865 B2
(45) Date of Patent: Jun. 20, 2006

(54) IMAGE PROCESSING METHOD AND APPARATUS FOR DETECTING CHARACTERISTIC POINTS

(75) Inventor: Atsushi Ishikawa, Anjo (JP)

(73) Assignee: Minolta Co., Ltd., Osaka (JP)

( * ) Notice: Subject to any disclaimer, the term of this patent is extended or adjusted under 35 U.S.C. 154(b) by 953 days.

(21) Appl. No.: 09/983,726

(22) Filed: Oct. 25, 2001

(65) Prior Publication Data
US 2002/0051157 A1    May 2, 2002

(30) Foreign Application Priority Data
Nov. 2, 2000    (JP) .............................. 2000-336023

(51) Int. Cl.
G06F 15/00    (2006.01)
G06K 15/00    (2006.01)
G06K 9/46    (2006.01)
G06K 9/40    (2006.01)

(52) U.S. Cl. .................. 358/1.9; 358/3.26; 382/192; 382/193; 382/194; 382/267; 382/275

(58) Field of Classification Search ............... 358/2.1, 358/462, 3.26, 1.9; 382/192–195, 199, 205, 382/261, 176, 275, 267, 269
See application file for complete search history.

(56) References Cited

U.S. PATENT DOCUMENTS 5,025,481 A * 6/1991 Ohuchi ...................... 382/176
5,446,802 A   8/1995 Tada et al.

FOREIGN PATENT DOCUMENTS

JP    03-141774    6/1991
JP    05-041796    2/1993

* cited by examiner

*Primary Examiner*—Kimberly Williams
*Assistant Examiner*—Charlotte M. Baker
(74) *Attorney, Agent, or Firm*—Buchanan Ingersoll PC

(57) ABSTRACT

An image processing method and device includes the steps of detecting a crossing point that has a largest density value among pixels aligned in one direction and a smallest density value among pixels aligned in another direction, the directions being perpendicular to each other; determining a dot area of an image based on a detection of crossing points; and switching image data processing methods based on a result of a determination of a dot area.

26 Claims, 15 Drawing Sheets

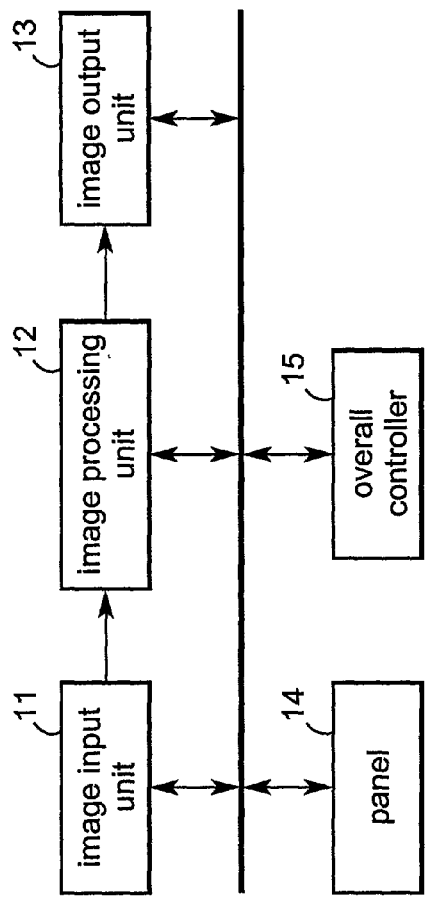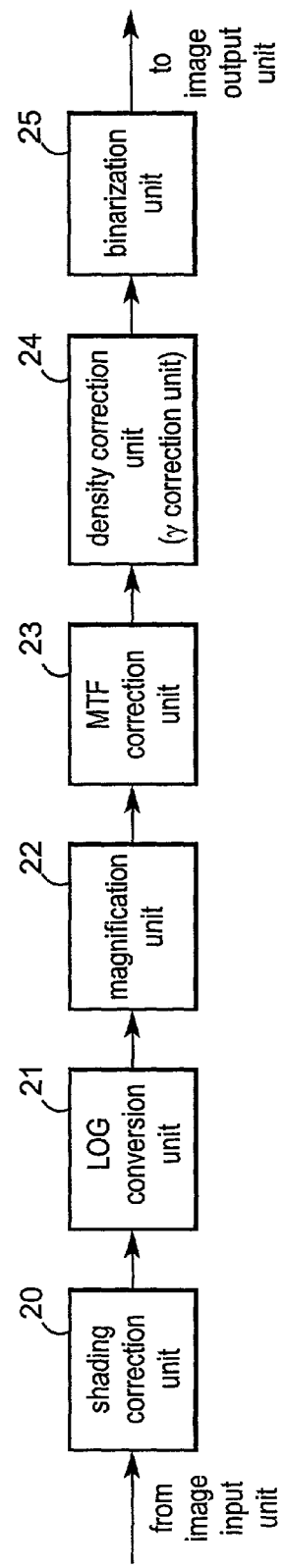

| V00 | V01 | V02 | V03 | V04 |
| --- | --- | --- | --- | --- |
| V10 | V11 | V12 | V13 | V14 |
| V20 | V21 | V22 | V23 | V24 |
| V30 | V31 | V32 | V33 | V34 |
| V40 | V41 | V42 | V43 | V44 |

IMAGE PROCESSING METHOD AND APPARATUS FOR DETECTING CHARACTERISTIC POINTS

CROSS-REFERENCE TO RELATED APPLICATIONS

This application claims the priority of application No. 2000-336023 filed in Japan on Nov. 2, 2000, the contents of which is hereby incorporated by reference.

BACKGROUND OF THE INVENTION

1. Field of the Invention

The present invention relates to an image processing apparatus that switches processing methods in accordance with the attribute of the image, and more particularly, to an image processing apparatus that can determine dot areas with superior accuracy.

2. Description of the Related Art

In a digital copying machine that reads an image using a CCD sensor and breaks it down to pixels to perform image processing, because the optimal image processing method varies depending on the nature of the image, i.e., whether the image comprises letters, a photo or dots, different image processing methods are used based on the result of a determination regarding the attribute of the image. When a dot image is copied, moire may occur due to the interference between the resolution of the CCD sensor (i.e., the sampling frequency) and the dot frequency of the original document. When moire occurs, the image quality deteriorates. Consequently, the dot areas existing in the original document should be accurately determined, and image processing that will reduce the generation of moire should be performed.

To that end, in an image processing apparatus incorporated in a digital copying machine or similar apparatus, dot area determination has conventionally been carried out. In one example of such determination, isolated points (i.e., largest-value points and smallest-value points), which are the characteristic of a dot area, are focused on, the number of isolated points existing in a prescribed area are counted, and determination of a dot area is made based on the counted number of isolated points. In another example, the distances between isolated points are calculated, and when the calculated distances exhibit periodicity, a dot area is determined to exist.

However, the conventional image processing apparatus described above has the problem that, if the resolution increases, dot area determination is not carried out accurately. This is caused because the accuracy of dot area determination by a conventional image processing apparatus depends on the accuracy of the detection of isolated points. As the resolution of the image increases, it becomes increasingly difficult to detect isolated points in dot images having a small number of lines (i.e., dot images having 100 L (lines per inch) or 85 L, for example). Where the resolution increases, the size of one dot (pixel) in the detection filter by which to detect isolated points becomes small relative to the dots. As a result, the difference in density from the surrounding pixels becomes small (in some cases, the difference in density completely disappears), making it difficult to determine isolated points. Consequently, when the resolution increases, the accuracy of dot area determination falls.

In addition, there are situations in which image noise and hand-written letter images are erroneously determined to belong to a dot area. This is caused by the tendency of image noise and hand-written letter images to have a density difference of a minimum prescribed value from their surrounding pixels, like isolated points.

OBJECTS AND SUMMARY

The present invention was created in order to resolve the problems identified above, and an object thereof is to provide an image processing apparatus that can accurately determine dot areas even when the resolution increases.

The image processing apparatus according to a first aspect of the invention has a dot characteristic point detecting means that detects a crossing point that has the largest density value among pixels aligned in one direction and the smallest density value among pixels aligned in another direction, said directions being perpendicular to each other, an attribute determining means that determines a dot area of an image based on the detection result by the dot characteristic point detecting means, and a switching means that switches image data processing methods based on the result of determination by the attribute determining means.

In this image processing apparatus, crossing points, each of which has the largest density value among pixels aligned in one direction and the smallest density value among pixels aligned in another direction, are detected by the dot characteristic point detecting means as dot characteristic points. Subsequently, dot areas of the image are determined by the attribute determining means based on the results of detection by the dot characteristic point detecting means. For example, a dot area may be determined based on the distribution of dot characteristic points. Image data processing methods are then switched by the switching means based on the result of determination by the attribute determining means. In other words, image processing that will reduce the generation of moire is performed regarding dot areas.

As shown in FIG. 9, if the resolution increases from 400 dpi to 600 dpi, the density difference between the target pixel (V22) and its surrounding pixels becomes small (i.e., changes from DE400 to DE600), and it becomes difficult to determine the existence of isolated points. Therefore, a pixel that can be detected as an isolated point when the resolution is 400 dpi may become more difficult to detect as an isolated point when the resolution is 600 dpi. In a dot image as shown in FIG. 10, the density values in the area A1 in two directions (V00–V44, V04–V40) are shown in FIG. 11, and the density values in the area A2 in two directions (V00–V44, V04–V40) are shown in FIG. 12.

In the area A1, as is clear from the density values shown in FIG. 11, the target pixel (V22) has substantially the same density value as its surrounding pixels. Consequently, in the dot image shown in FIG. 10, the target pixel (V22) cannot be determined as an isolated point. In other words, isolated points cannot be detected. On the other hand, in the area A2, as is clear from the density values shown in FIG. 12, the target pixel (V22) is a crossing point that has the largest value among pixels aligned in one direction and the smallest value among pixels aligned in another direction. In other words, in the dot image shown in FIG. 10, isolated points cannot be detected but crossing points may be accurately determined. Furthermore, because crossing points do not disappear when the resolution increases, they can be easily detected even when the resolution increases.

Moreover, as shown in FIG. 13, for example, in a 9 by 20 matrix, black isolated points or white isolated points may be detected only up to a maximum of 25 points, but crossing points may be detected up to a maximum of 50 points, as shown in FIG. 14. The images shown in FIGS. 13 and 14 are 400 dpi and 133L 50% dot images.

As described above, even when it is difficult to detect isolated points due to an increase in resolution, crossing points may be accurately detected. In addition, because the characteristics of image noise and letter images are substantially different from the characteristics of crossing points, image noise and letter images are not erroneously determined as crossing points. Therefore, by detecting crossing points as dot characteristic points, the accuracy of dot characteristic point detection improves, resulting in more accurate dot area determination.

The image processing apparatus according to a second aspect of the invention includes a dot characteristic point detecting means that detects dot characteristic points, a dot characteristic point counting means that counts the number of dot characteristic points that exist in a prescribed area including the target pixel and are detected by the dot characteristic point detecting means, an attribute determining means that performs determination as to whether or not the target pixel belongs to a dot area by comparing the result of counting by the dot characteristic point counting means with a prescribed threshold value, and a switching means that switches image data processing methods based on the result of determination by the attribute determining means, wherein the dot characteristic point detecting means detects crossing points, each of which has the largest density value among pixels aligned in one direction and the smallest density value among pixels aligned in another direction, said two directions crossing each other, as dot characteristic points.

In this image processing apparatus, characteristic points of a dot area are detected by the dot characteristic point detecting means. Specifically, crossing points, each of which has the largest density value among pixels aligned in one direction and the smallest density value among pixels aligned in another direction crossing the first direction, are detected as dot characteristic points. Subsequently, the number of dot characteristic points detected by the dot characteristic point detecting means in a prescribed area including the target pixel is counted by the dot characteristic point counting means. In other words, the total number of crossing points that exist in the prescribed area is calculated.

The result of counting by the dot characteristic point counting means is compared with a prescribed threshold value by the attribute determining means, and based on the result of this comparison, it is determined whether or not the target pixel belongs to a dot area. For the prescribed threshold value, the number of crossing points as to which the determination can be made that the target pixel at the center of the prescribed area is included in a dot area, i.e., that the prescribed area is a dot area, should be specified. The switching means switches the image data processing method based on the result of determination by the attribute determining means. In other words, image processing that will reduce the generation of moire is carried out with respect to dot areas.

As described above, when it becomes difficult to detect isolated points due to the increase in resolution, crossing points may be accurately detected. In addition, because the characteristics of image noise and letter images are substantially different from the characteristics of crossing points, image noise and letter images are not erroneously determined as crossing points. Furthermore, when dot characteristic points are detected, more crossing points may be detected than isolated points in the same area. Therefore, the accuracy of detection of dot characteristic points and the accuracy of dot area determination itself improve, and therefore dot area determination may be performed with superior accuracy.

The dot characteristic point detecting means can be used to detect multiple types of crossing points by using detection patterns having different crossing angles. In doing so, dot images having different screen angles may be accommodated. This process is particularly effective for color images in which dot images having multiple screen angles are formed. However, if the number of screen angles that may be handled is increased, i.e., if the number of detection patterns is increased, the number of detected crossing points increases, and erroneous dot area determination due to detection errors that occur in connection with the above increase also increases. Therefore, it is preferred that detection patterns that can accommodate two or three types of screen angles be used.

Here, 'detection pattern' means, in the case in which the 5 by 5 matrix image data shown in FIG. 4 is used, for example, a pattern formed by V00, V11, V22, V33, V44 and V04, V13, V22, V31, V40, or a pattern formed by V01, V11, V22, V33, V43 and V03, V13, V22, V31, V41. The case in which the relationship present between the pattern formed by V03, V13, V22, V31, V41 and V10, V11, V22, V33, V34 and the pattern formed by V01, V11, V22, V33, V43 and V14, V13, V22, V31, V30 exist is also included in 'detection patterns having different forms'.

The dot characteristic point counting means can be used to separately count the number of each type of crossing point that is detected by the dot characteristic point detecting means, and the attribute determining means determines whether or not the target pixel belongs to a dot area by comparing the result of counting for each type of crossing points by the dot characteristic point counting means with a prescribed threshold value. This is done because by comparing the results of counting of the multiple types of crossing points with threshold values that are appropriate for each counting result in this way, the accuracy of dot area determination increases.

The dot characteristic point detecting means also can be used to detect as dot characteristic points isolated points that have a density difference relative to its surrounding pixels that exceeds a prescribed value.

Here, FIG. 16 shows the density values of pixels aligned in two directions (V00–V44, V04–V40) in the area B1 of the dot image shown in FIG. 15, and FIG. 17 shows the density values of pixels aligned in two directions (V00–V44, V04–V40) in the area B2 of the same image. The dot density in the dot image of FIG. 15 is 12.5%.

In the area B1, as is clear from the density values shown in FIG. 16, the density value of the target pixel (V22) is substantially larger than those of its surrounding pixels. Therefore, in the dot image of FIG. 15, the target pixel (V22) may be detected as an isolated point. On the other hand, in the area B2, as is clear from the density values shown in FIG. 17, because the density value of the target pixel (V22) is the smallest when compared with the other pixels aligned with it in one direction, but is not the largest when compared with the pixels aligned with it in the other direction, it cannot be detected as a crossing point. In other words, in a dot image having a low dot density, as in the case of FIG. 15, detection of crossing points is difficult, while the accuracy of detection of isolated points increases.

Therefore, if the dot characteristic point detecting means detects isolated points in addition to detecting crossing points as dot characteristic points, dot characteristic points may be accurately detected regardless of the dot density.

Consequently, the accuracy of dot characteristic point detection increases, resulting in improved dot area determination accuracy.

Furthermore, the dot characteristic point counting means can be used to separately count the number of crossing points and the number of isolated points, both of which are detected by the dot characteristic point detecting means, and the attribute determining means determines whether or not a target pixel belongs to a dot area by comparing each result of counting by the dot characteristic point counting means with a prescribed threshold value. This is carried out because the accuracy of dot area determination increases by comparing the result of counting of crossing points and the result of counting of isolated points with separate threshold values appropriate for each counting result.

Moreover, the dot characteristic point detecting means may output as dot characteristic points the OR calculation result regarding the crossing points and the isolated points detected by the dot characteristic point detecting means. In this way, it becomes no longer necessary for the dot characteristic point counting means to separately count the number of crossing points and the number of isolated points, and therefore the line memories that temporarily store the detection data from the dot characteristic point detecting means may be eliminated.

The attribute determining means can also be used to add the separate counting results obtained by the dot characteristic point counting means and compare the sum with a prescribed threshold value to determine whether or not a target pixel belongs to a dot area. This is performed because by using the sum of the separate counting results obtained by the dot characteristic point counting means for area determination, the accuracy of dot area determination improves.

The image processing apparatus according to another aspect of the present invention has a dot characteristic point detecting means that detects a target pixel that has the largest density value among multiple pixels that are aligned on a continuous basis in a first direction and has the smallest density value among multiple pixels that are aligned on a continuous basis in a second direction, an attribute determining means that determines a dot area in the image based on the result of detection by the dot characteristic point detecting means, and a switching means that switches image data processing methods based on the result of determination by the attribute determining means.

The essence of the present invention lies in the detection of dot characteristic points used for the determination of dot areas. In the conventional art, isolated points that have a density different from their surrounding pixels were detected as dot characteristic points. In the present invention, target pixels that have the largest density value among pixels aligned in one direction and the smallest density value among pixels aligned in another direction can be detected as dot characteristic points.

BRIEF DESCRIPTION OF THE DRAWINGS

FIG. 1 is a block diagram showing in a summary fashion the construction of a digital copying machine pertaining to a first embodiment;

FIG. 2 is a block diagram showing in a summary fashion the construction of the image processing unit shown in FIG. 1;

DETAILED DESCRIPTION OF THE PREFERRED EMBODIMENTS

Figures 3, 4:
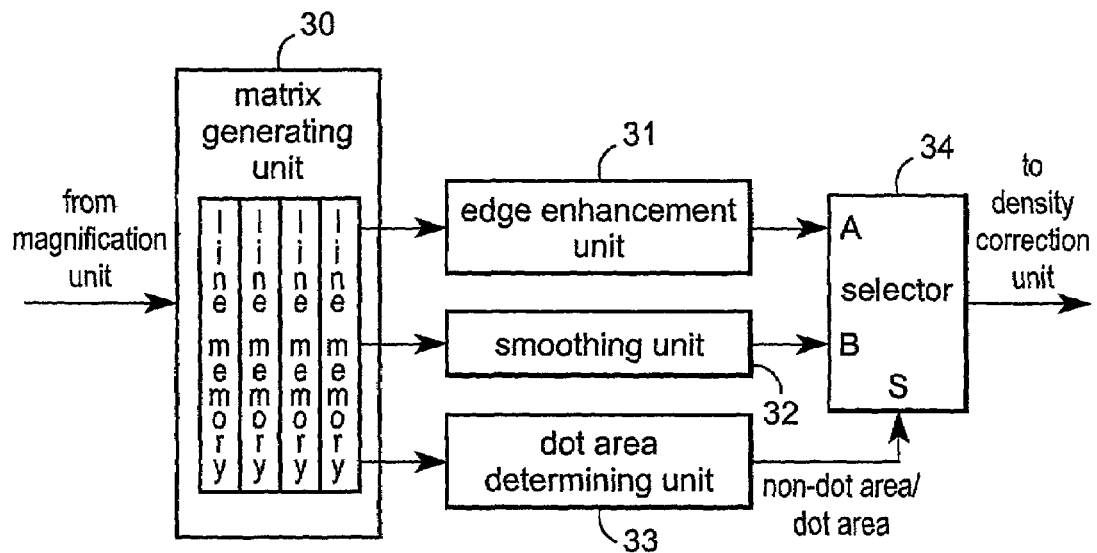
FIG. 3 is a block diagram showing in a summary fashion the MTF correction unit shown in FIG. 2.
FIG. 4 is a drawing showing the data construction of 5 by 5 matrix image signals.

The preferred embodiments in which the image processing apparatus of the present invention is implemented are explained below with reference to the drawings. Each embodiment comprises an image processing apparatus pertaining to the present invention applied in a digital copying machine.

First Embodiment

FIG. 1 shows in a summary fashion the construction of one embodiment of a copying machine pertaining to the present invention. The copying machine includes an image input unit 11, an image processing unit 12, an image output unit 13, a panel 14, and an overall controller 15. The image input unit 11 obtains image data. Specifically, the reflected light that is obtained through scanning of the original document using a scanner is received using a CCD sensor, and the received light is subjected to photoelectric conversion to obtain analog image data. This analog image data is converted into digital image data, and is transmitted to the image processing unit 12.

The image processing unit 12 performs various types of processing with regard to the digital image data received from the image input unit 11. This image processing unit 12 includes, as shown in FIG. 2, a shading correction unit 20, a reflection ratio/density conversion (hereinafter 'LOG conversion') unit 21, a magnification unit 22, an MTF correction unit 23, a density correction unit 24 and a binarization unit 25.

The shading correction unit 20 removes unevenness in the image light amount in the main scanning direction. Specifically, before the reading of the original document, the light reflected from the white plate used for shading correction is received by the CCD sensor, and the analog data obtained thereby is converted into digital data, which is then stored in a memory. During reading of the original document, the data read from the original document is corrected using the digital data stored in the memory as a standard.

The LOG conversion unit 20 performs LOG conversion using a look-up table in order to obtain density scale image data. The magnification unit 22 performs enlargement or reduction in the main scanning direction of the image via control of the writing and reading to and from the memory. The MTF correction unit 23 performs correction regarding the image sharpness, etc. The details regarding the MTF correction unit 23 will be described later. The density correction unit 24 performs density correction in accordance with the image mode and exposure level settings. The binarization unit 25 converts multi-value image data into binary image data using, for example, the error diffusion method.

The image data that has been processed by these processing units 20 through 25 is then sent by the image processing unit 12 to the image output unit 13.

Returning to FIG. 1, the image output unit 13 forms an image on the recording medium based on the image data. The panel 14 is used by the operator to specify parameter values necessary for copying, such as the image mode, original document size and exposure level. Reading of the image by the copying machine begins when the start key in the panel 14 is depressed. The overall controller 15 controls the entire copying machine based on the settings information from the panel 14.

FIG. 3 shows in a summary fashion the construction of the MTF correction unit 23 shown in FIG. 2. The MTF correction unit 23 includes a matrix generating unit 30, an edge enhancement unit 31, a smoothing unit 32, a dot area (dot image area) determining unit 33, and a selecting unit 34. Based on this construction, the MTF correction unit 23 performs edge enhancement, smoothing and area determination using a two-dimensional digital filter. Specifically, edge enhancement and smoothing are performed in accordance with the image mode. In other words, when character mode is activated, edge enhancement is increased, and when photo mode is activated, edge enhancement is reduced. The matrix generating unit 30 generates a 5 by 5 matrix image data shown in FIG. 4 using a line memory.

The selecting unit 34 selects either the smoothing process or the edge enhancement process based on the attribute of the image. Therefore, image data that has undergone edge enhancement is input from the edge enhancement unit 31 to the terminal A of the selecting unit 34. Image data that has undergone smoothing is input from the smoothing unit 32 to the terminal B of the selecting unit 34. A signal indicating the dot area or non-dot area attribute of the image is input to the terminal S of the selecting unit 34 from the dot area determining unit 33. Based on this construction, the selecting unit 34 selects image data that has undergone smoothing for pixels that belong to dot areas in order to prevent moire, and selects image data that has undergone edge enhancement for pixels that belong to non-dot areas.

Figure 5:
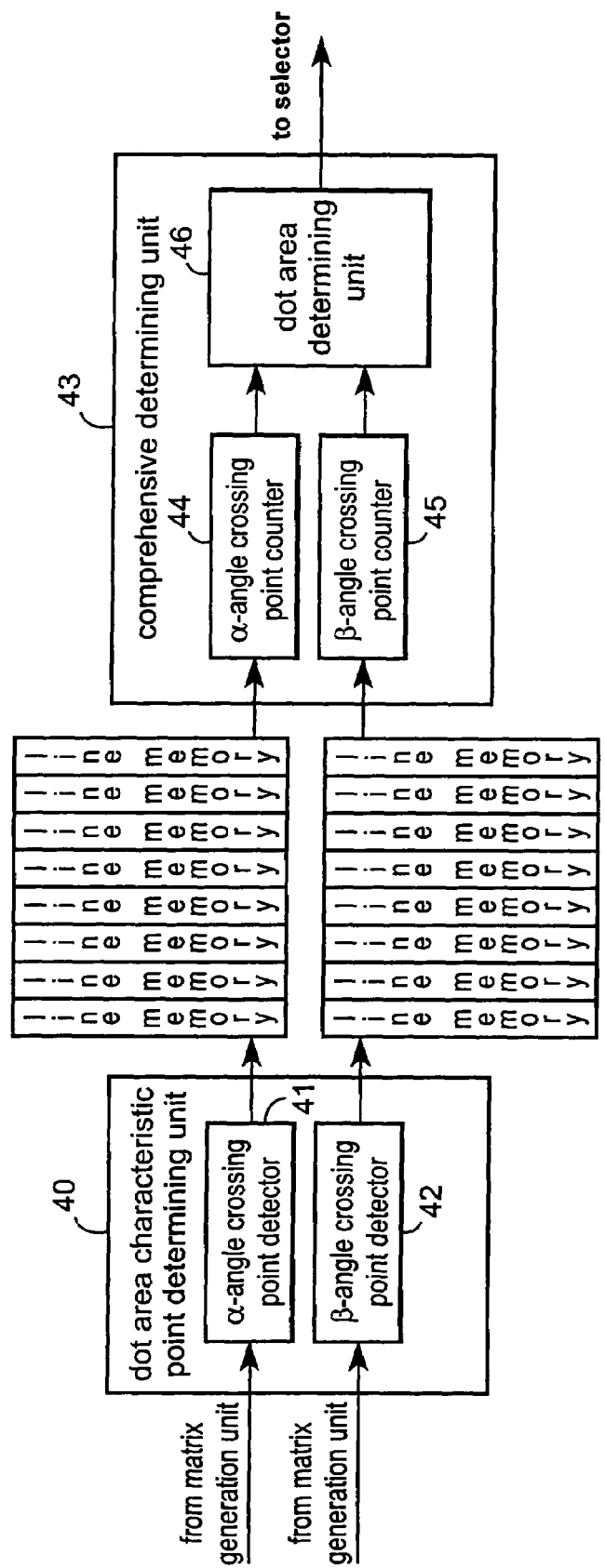
FIG. 5 is a block diagram showing in a summary fashion the construction of the dot determining unit shown in FIG. 3.

The dot determining unit 33 performs attribute determination regarding whether the target pixel belongs to a dot area or a non-dot area. The construction of the dot determining unit 33 is shown in a summary fashion in FIG. 5. The dot determining unit 33 includes a dot characteristic point detecting unit 40 and a comprehensive determining unit 43.

The dot characteristic point detecting unit 40 uses a 5 by 5 detection filter and detects crossing points that have the largest density value among multiple pixels aligned in one direction and the smallest density value among multiple pixels aligned in another direction. With the dot characteristic point detecting unit 40 detecting crossing points in this way, more dot characteristic points (crossing points) may be detected in a prescribed area than when isolated points are detected (see FIGS. 13 and 14).

This dot characteristic point detecting unit 40 includes an α-angle crossing point detecting unit 41 and a β-angle crossing point detecting unit 42. Here, α and β angles correspond to dot screen angles. The α-angle corresponds to a screen angle of approximately 45 degrees, while the β-angle corresponds to a screen angle of approximately 60 degrees. Therefore, the dot characteristic point detecting unit 40 can detect crossing points that correspond to two different dot screen angles.

While this embodiment can handle two different dot screen angles, it is also possible to handle three or more different dot screen angles. If the number of dot screen angles that may be handled is increased, the types of dot images that may be detected also increases. However, it is preferred that the number of dot screen angles that may be handled be limited to two or three, because if the number of such dot screen angles is increased, erroneous determination also increases.

The α-angle crossing point detecting unit 41 determines that the target pixel V22 is an α-angle crossing point when the density value of each pixel meet the following conditions:

$V22 < \text{MIN}(V00, V11, V33, V44) - \text{OFFSET 1}$, and $V22 > \text{MAX}(V40, V31, V13, V04) + \text{OFFSET 2}$, or $V22 > \text{MAX}(V00, V11, V33, V44) + \text{OFFSET 2}$, and $V22 < \text{MIN}(V40, V31, V13, V04) - \text{OFFSET 1}$ The β-angle crossing point detecting unit 42 determines the target pixel V22 to be a β-angle crossing point when the density value of each pixel meet the following conditions:

$V22 < \text{MIN}(V10, V11, V33, V34) - \text{OFFSET 1}$, and $V22 > \text{MAX}(V41, V31, V13, V03) + \text{OFFSET 2}$, or $V22 > \text{MAX}(V10, V11, V33, V34) + \text{OFFSET 2}$, and $V22 < \text{MIN}(V41, V31, V13, V03) - \text{OFFSET 1}$ OFFSET 1 and OFFSET 2 are the threshold values for crossing point determination.

The comprehensive determining unit 43 counts the number of crossing points detected by the dot characteristic point detecting unit 40, and determines the attribute (dot area or non-dot area) of the target pixel based on the result of the counting. The comprehensive determining unit 43 includes an α-angle crossing point counting unit 44, a β-angle crossing point counting unit 45, and a dot determining unit 46. The α-angle crossing point counting unit 44 counts the number of the α-angle crossing points that exist in a prescribed area (a 9 by 20 matrix in this embodiment) that is generated using a line memory and includes the target pixel generated using the line memory. Similarly, the β-angle crossing point counting unit 45 counts the number of the β-angle crossing points that exist in a prescribed area (a 9 by 20 matrix in this embodiment) including the target pixel.

Figure 6:
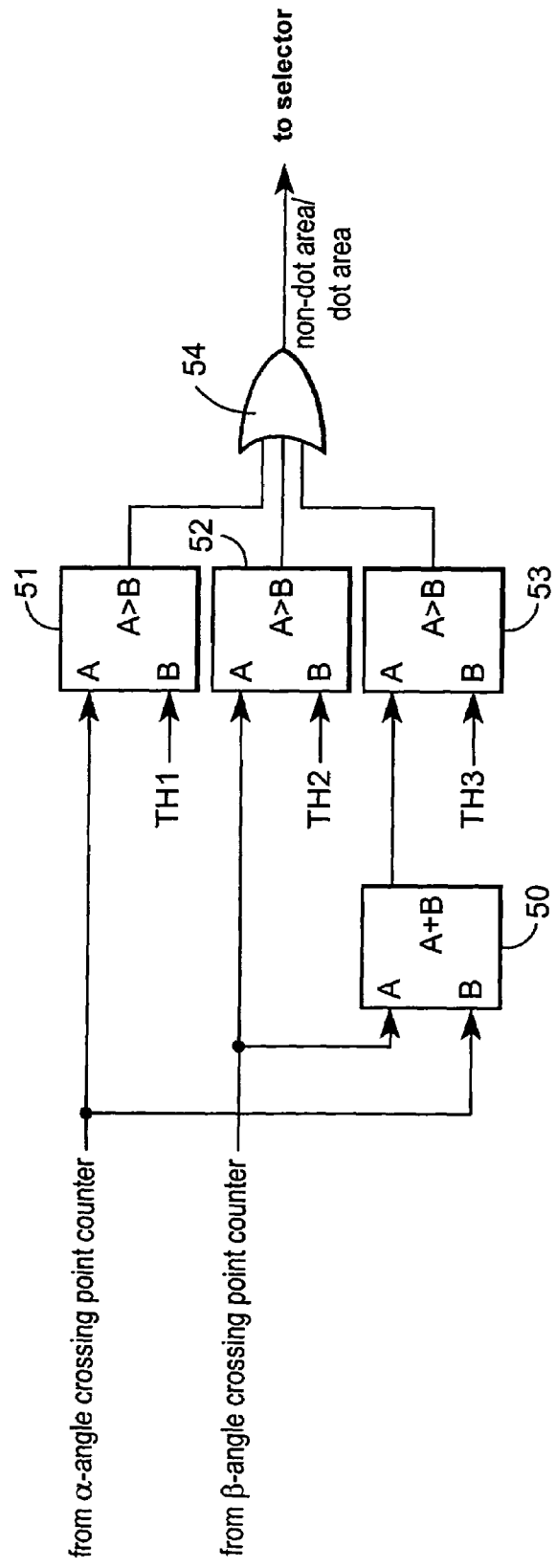
FIG. 6 is a circuit diagram showing the construction of the dot determining unit shown in FIG. 5.

The dot determining unit 46 determines the attribute of the target pixel (dot area or non-dot area) based on the results of counting by the α-angle crossing point counting unit 44 and the β-angle crossing point counting unit 45. This dot determining unit 46 comprises one adder 50, three comparators 51 through 53, and an OR circuit 54, as shown in FIG. 6. The count value obtained by the β-angle crossing point counting unit 45 is input to the terminal A of the adder 50, and the count value obtained by the α-angle crossing point counting unit 44 is input to the terminal B thereof. The count value obtained by the α-angle crossing point counting unit 44 is input to the terminal A of the comparator 51, and a threshold value TH1 is input to the terminal B thereof. The count value obtained by the β-angle crossing point counting unit 45 is input to the terminal A of the comparator 52, and a threshold value TH2 is input to the terminal B thereof. The output result from the adder 50 is input to the terminal A of the comparator 53, and a threshold value TH3 is input to the terminal B thereof. The output results of the comparators 51 through 53 are input to the OR circuit 54.

Based on this construction, the dot determining unit 46 determines that the target pixel belongs to a dot area when at least one of the following conditions (1) through (3) is met. These conditions (1) through (3) are (1) the count value for α-angle crossing points exceeds the threshold value TH1, (2) the count value for β-angle crossing points exceeds the threshold value TH2, and (3) the sum of the count value for α-angle crossing points and the count value for β-angle crossing points exceeds the threshold value TH3.

In this embodiment, the dot determining unit 46 uses the sum of the count value for α-angle crossing points and the count value for β-angle crossing points for the determination of a dot area. Consequently, the accuracy of dot area determination regarding a color image increases, because in the case of a color image, dot images in the same original document often have varied dot screen angles depending on the color. The dot screen angle is varied depending on the color of a color image in this way in order to prevent the occurrence of color moire.

Dot area determination can also be performed based only on the result of comparison between the count value for α-angle crossing points and the threshold value TH1, or the result of comparison between the count value for β-angle crossing points and the threshold value TH2, or the result of comparison between the sum of the count value for α-angle crossing points and the count value for β-angle crossing points and the threshold value TH3.

The operation of the digital copying machine having the above construction will now be explained. First, the image information regarding the original document is read by the image input unit 11. The image data read by the image input unit 11 is then transmitted to the image processing unit 12. The image processing unit 12 performs shading correction, LOG conversion, magnification, MTF correction, density correction and binarization with regard to the image data in a sequential manner. Based on the image data, which has undergone the various types of image processing, the image output unit 13 generates a reproduced image of the original document on the recording medium. The recording medium, on which the image has been formed, is then ejected outside the machine, whereupon copying for one page is completed.

The dot area determination method used during the above copying operation will now be explained. Dot area determination is performed by the MTF correction unit 23 included in the image processing unit 12. More precisely, it is performed by the dot determining unit 33 included in the MTF correction unit 23. First, the image data output from the magnification unit 22 is converted by the matrix generating unit 30 into 5 by 5 matrix image data having a raster construction shown in FIG. 4. Using this 5 by 5 matrix image data, the dot characteristic point detecting unit 40 performs detection of crossing points. The detection of crossing points is performed with regard to the entire area of the original document by repeating the operation in which the 5 by 5 matrix area is shifted in the main scanning direction by one pixel, and when the last position in the main scanning direction is reached, the matrix is shifted in the secondary scanning direction by one pixel.

Figure 12:
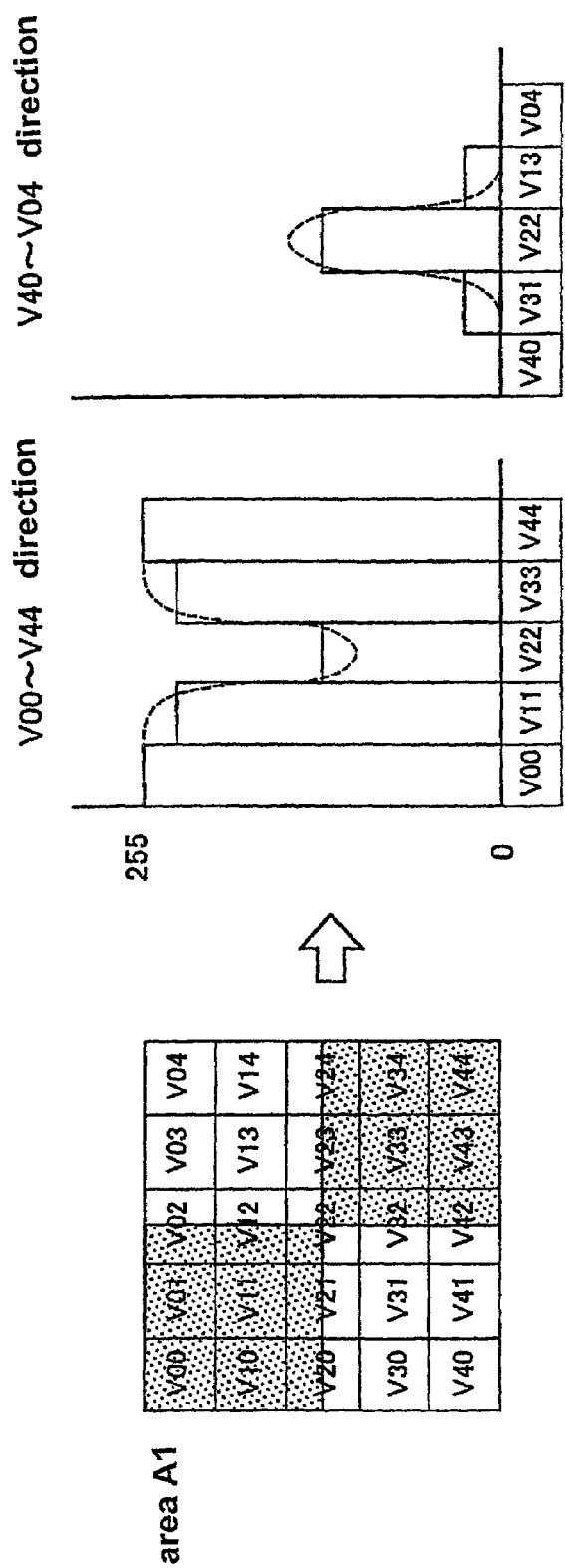
FIG. 12 is a drawing showing the density value of each pixel aligned in two different directions in the area A2 of FIG. 10 (crossing point detection)

Crossing point detection is performed by the α-angle crossing point detecting unit 41 and the β-angle crossing point detecting unit 42. Here, the detection of α-angle crossing points by the α-angle crossing point detecting unit 41 will be explained. First, the density values of the pixels (V00, V11, V22, V33, V44) aligned in the V00–V44 direction are detected in the 5 by 5 matrix image data received from the matrix generating unit 30. At the same time, the density values of the pixels (V04, V13, V22, V31, V40) aligned in the V04–V40 direction are detected. As a result of the density value detection regarding the pixels aligned in these two directions, if the density value of the target pixel V22 is the largest among the pixels aligned in one direction and the smallest among the pixels aligned in the other direction, the target pixel V22 is detected as an α-angle crossing point (see FIG. 12).

Similarly, β-angle crossing points are detected by the β-angle crossing point detecting unit 42. In the detection of β-angle crossing points, the density values of the pixels (V10, V11, V22, V33, V34) aligned in the V10–V34 direction and the pixels (V14, V13, V22, V31, V30) aligned in the V14–V30 direction are detected.

Figure 9:
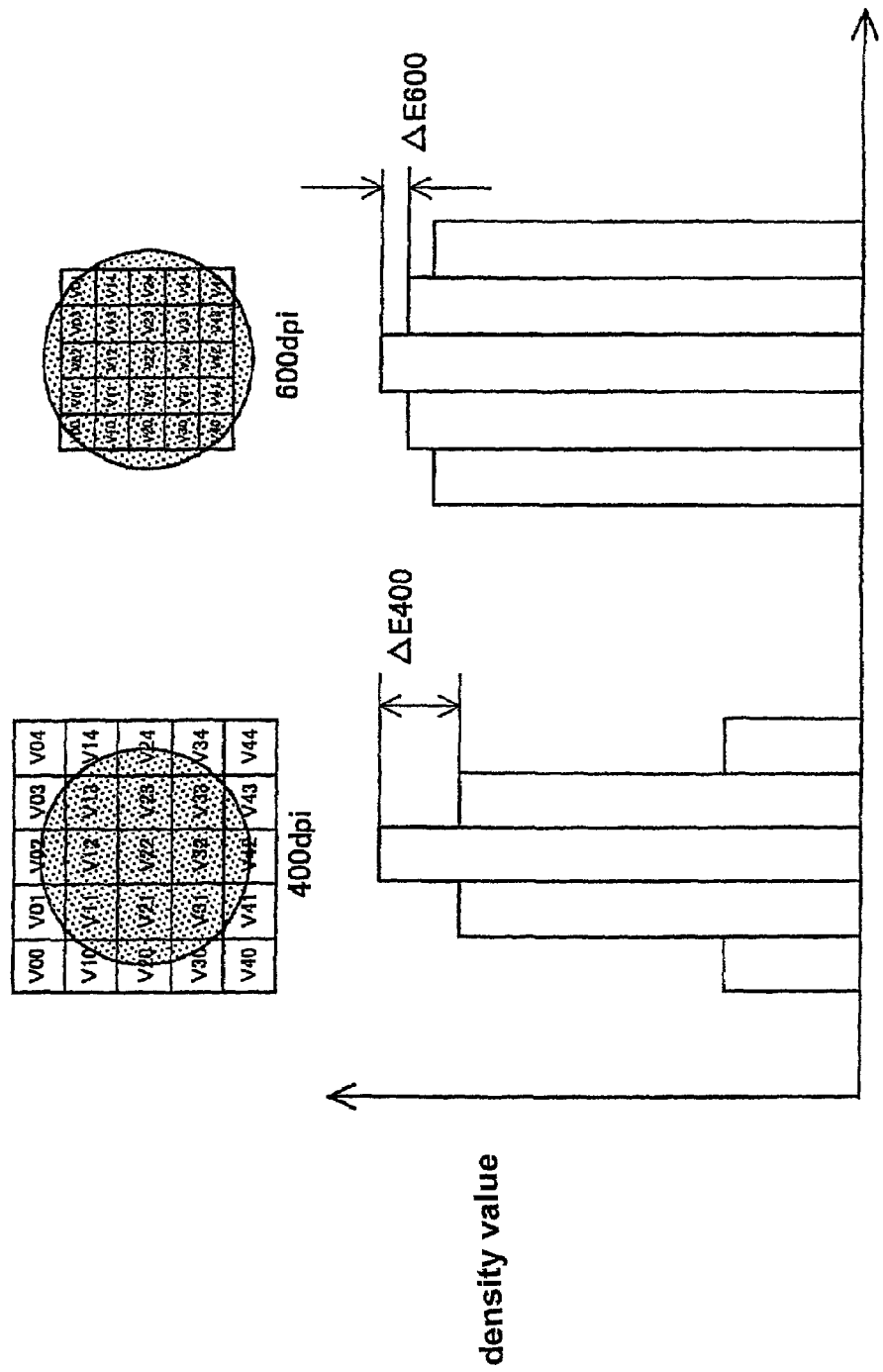
FIG. 9 is a drawing showing the density value of each pixel aligned in one direction in images with different resolutions.
Figure 10:
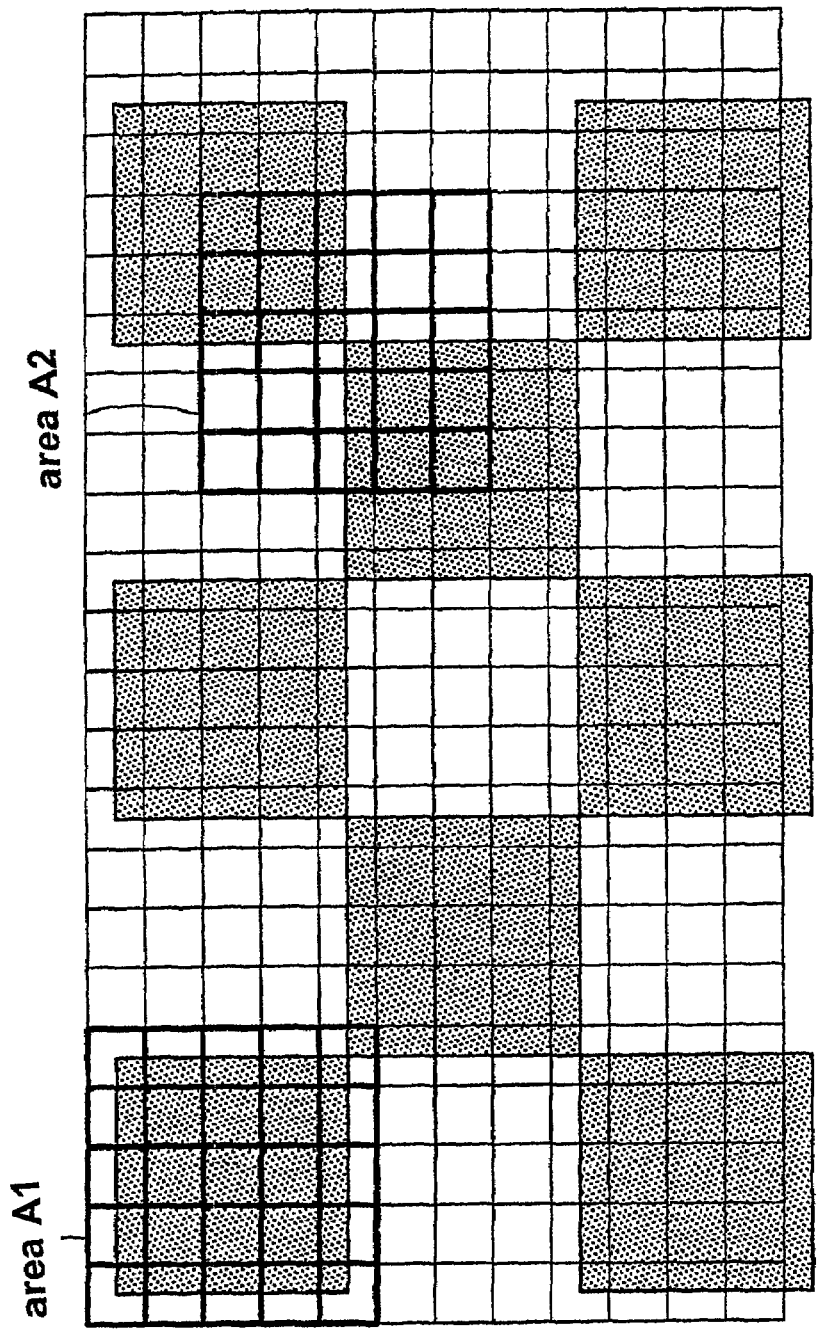
FIG. 10 is a drawing showing one example of a dot image.
Figure 11:
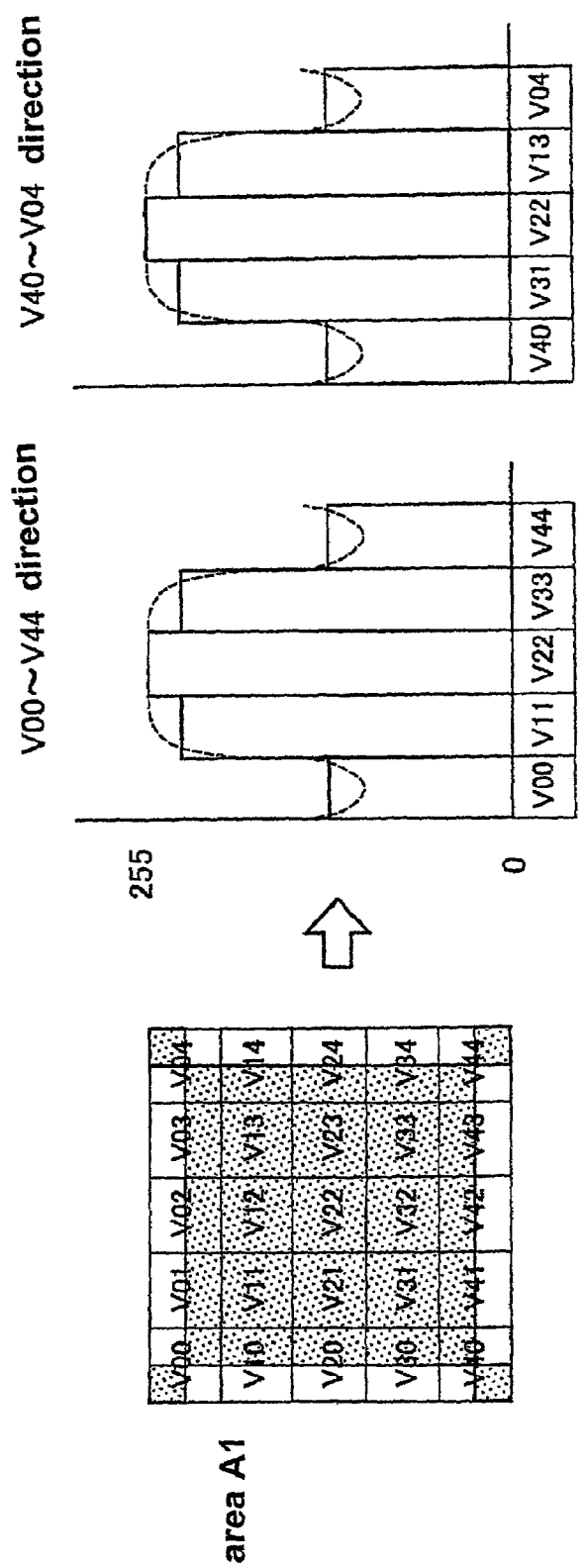
FIG. 11 is a drawing showing the density value of each pixel aligned in two different directions in the area A1 of FIG. 10 (isolated point detection)

If the resolution increases, detection of isolated points becomes difficult, because the dot size in the detection filter by which to detect isolated points becomes small relative to the dots, and the difference in density from the surrounding pixels becomes small (see FIG. 9). In contrast, the accuracy of crossing point detection is not affected by the resolution. Therefore, the dot characteristic point detecting unit 40 can detect crossing points, which comprise dot characteristic points, with superior accuracy even if the resolution increases. In addition, because the characteristics of image noise and letter images are substantially different from the characteristics of crossing points, image noise and letter images are not erroneously determined to be crossing points.

When the detection of crossing points by the dot characteristic point detecting unit 40 is completed, the line memory is used to generate a two-dimensional local area (a 9 by 41 matrix) in which to count crossing points. This area is generated so that α-angle crossing points and β-angle crossing points may be counted. The α-angle crossing point counting unit 44 counts the number of the α-angle crossing points that exist in the above area. Similarly, β-angle crossing point counting unit 45 counts the number of the β-angle crossing points that exist in the above area. The numbers of α-angle crossing points and β-angle crossing points are counted throughout the entire original document by repeating the operation in which the two-dimensional local area is shifted in the main scanning direction by one pixel, and when the last position in the main scanning direction is reached, by shifting the two-dimensional local area in the secondary scanning direction by one pixel.

Figure 13:
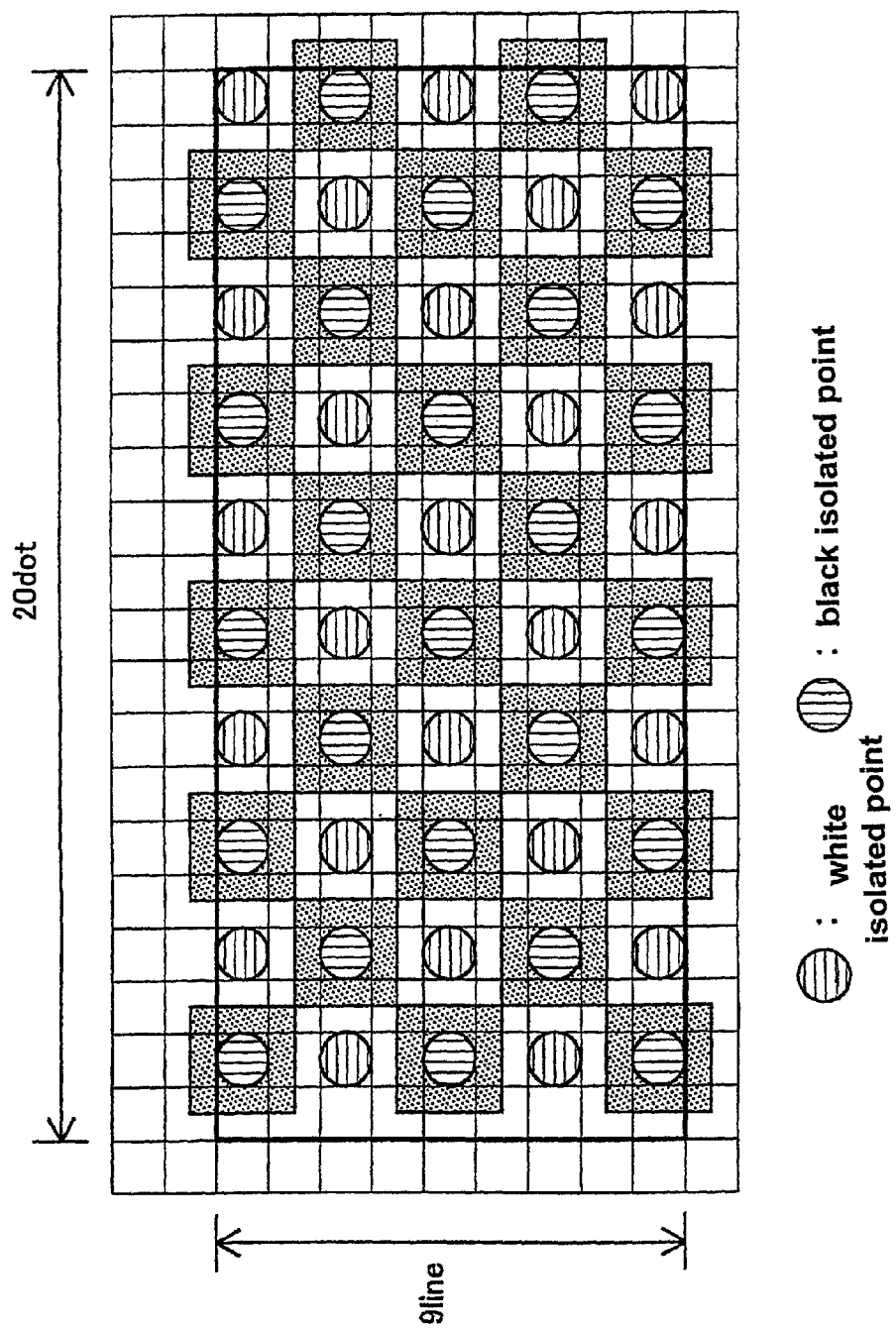
FIG. 13 is a drawing showing one example of the result of counting isolated points.
Figure 14:
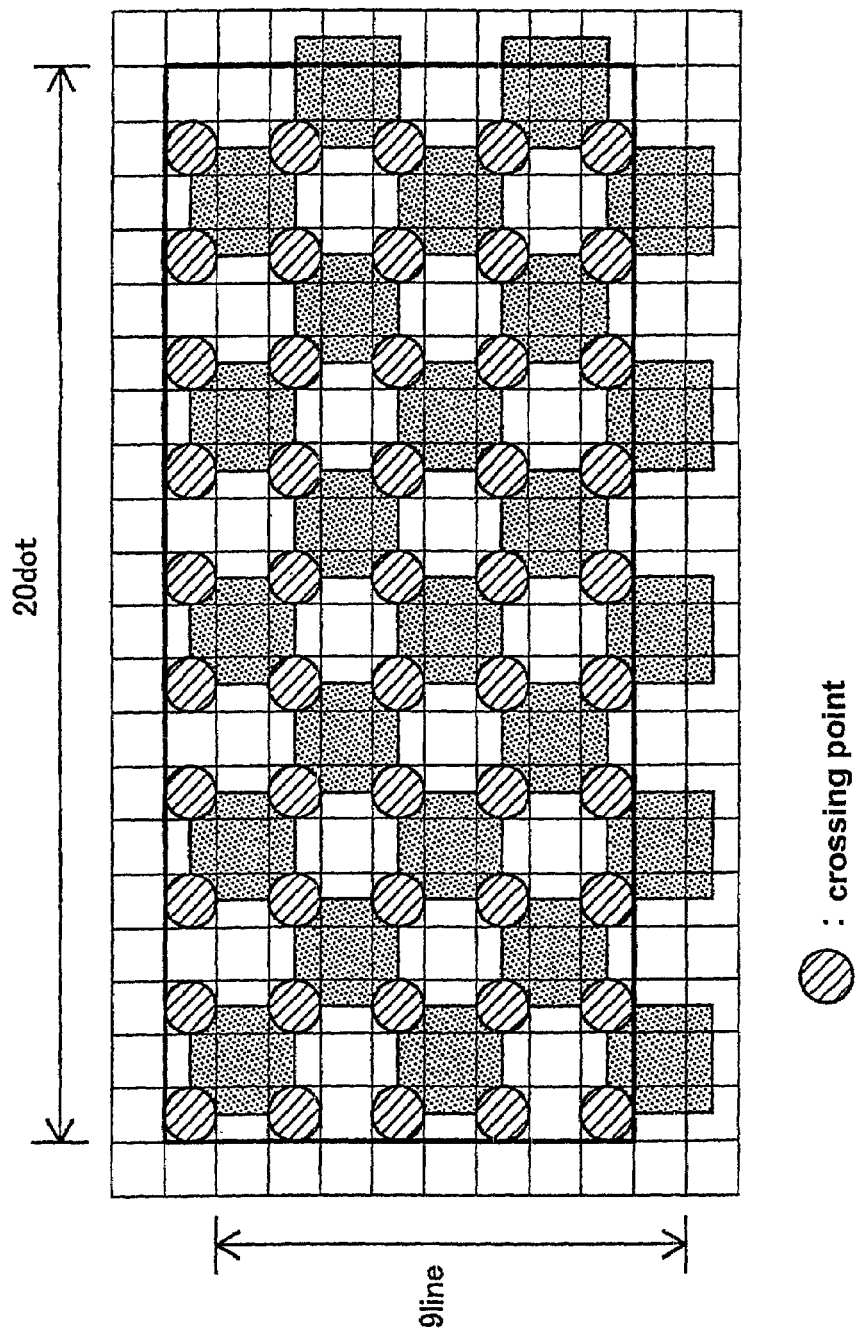
FIG. 14 is a drawing showing one example of the result of counting crossing points.
Figure 15:
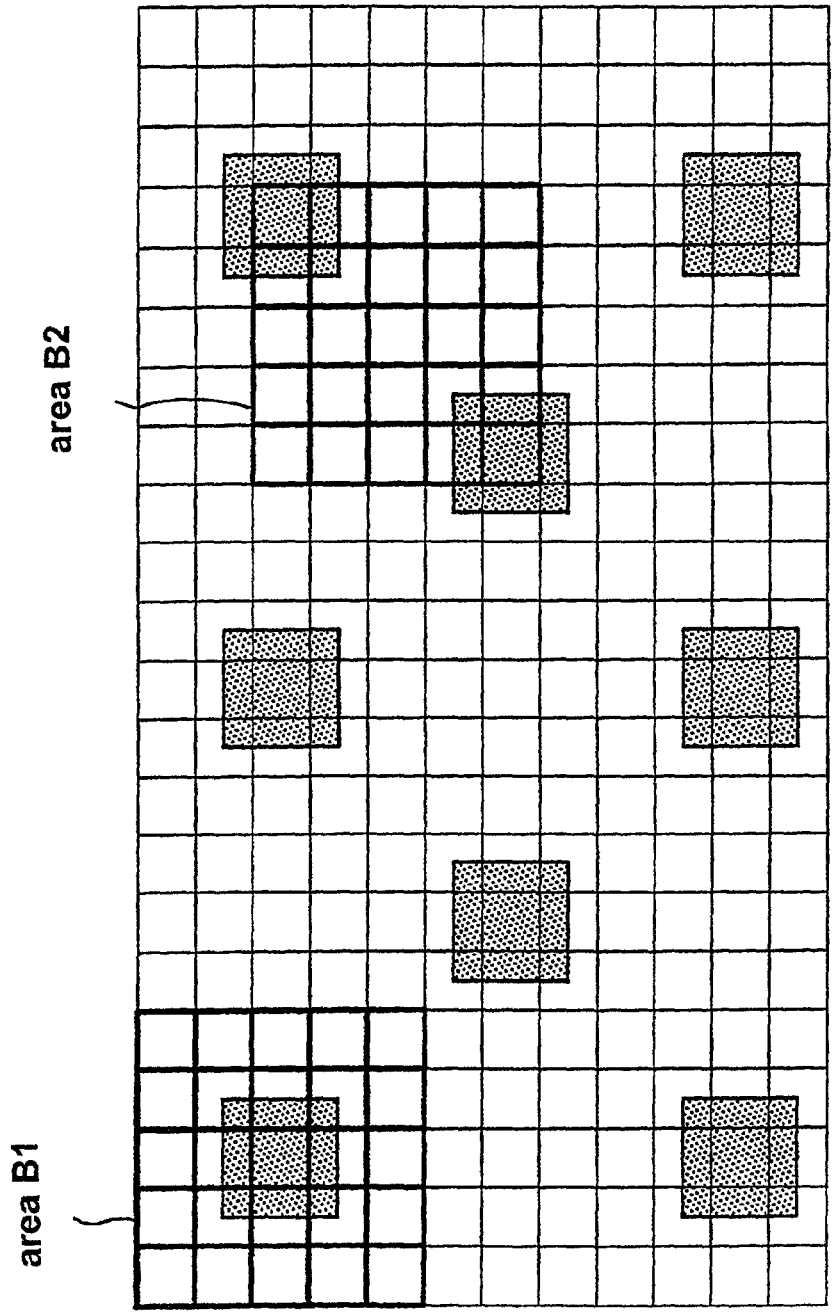
FIG. 15 is a drawing showing another example of a dot image.
Figure 16:
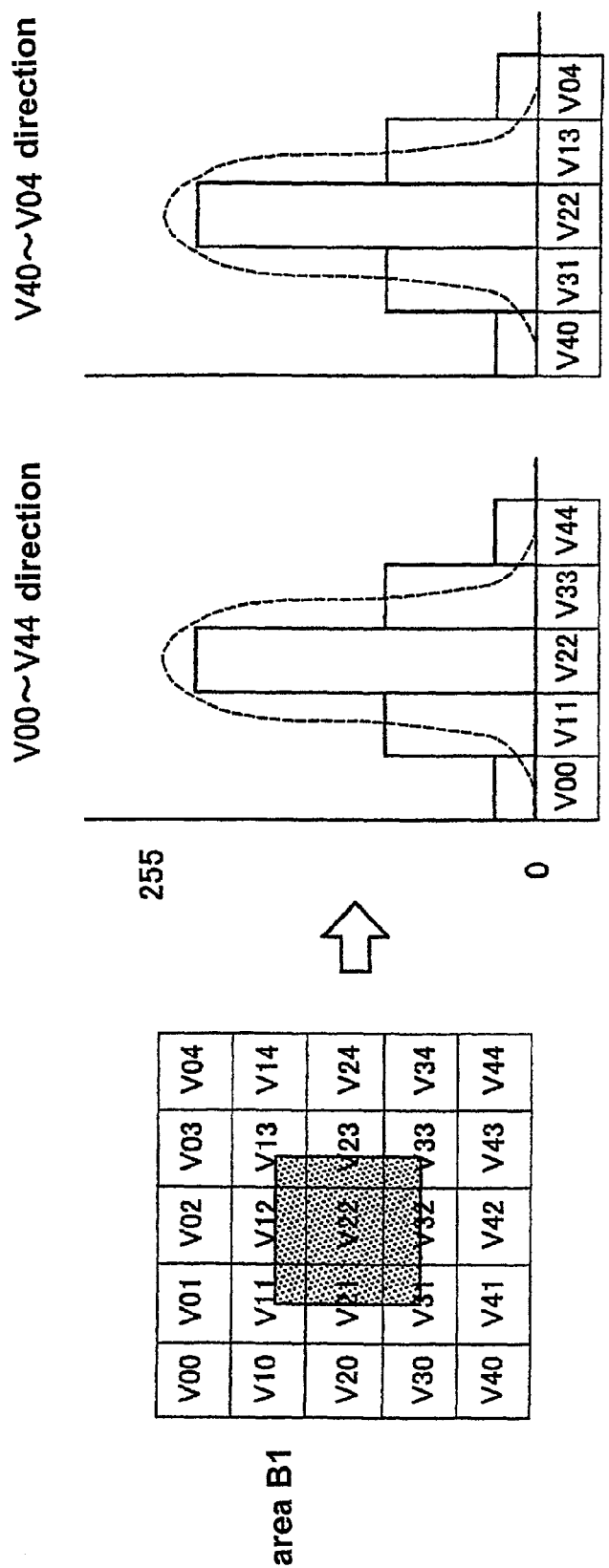
FIG. 16 is a drawing showing the density value of each pixel in two different directions in the area B1 of FIG. 15 (isolated point detection)
Figure 17:
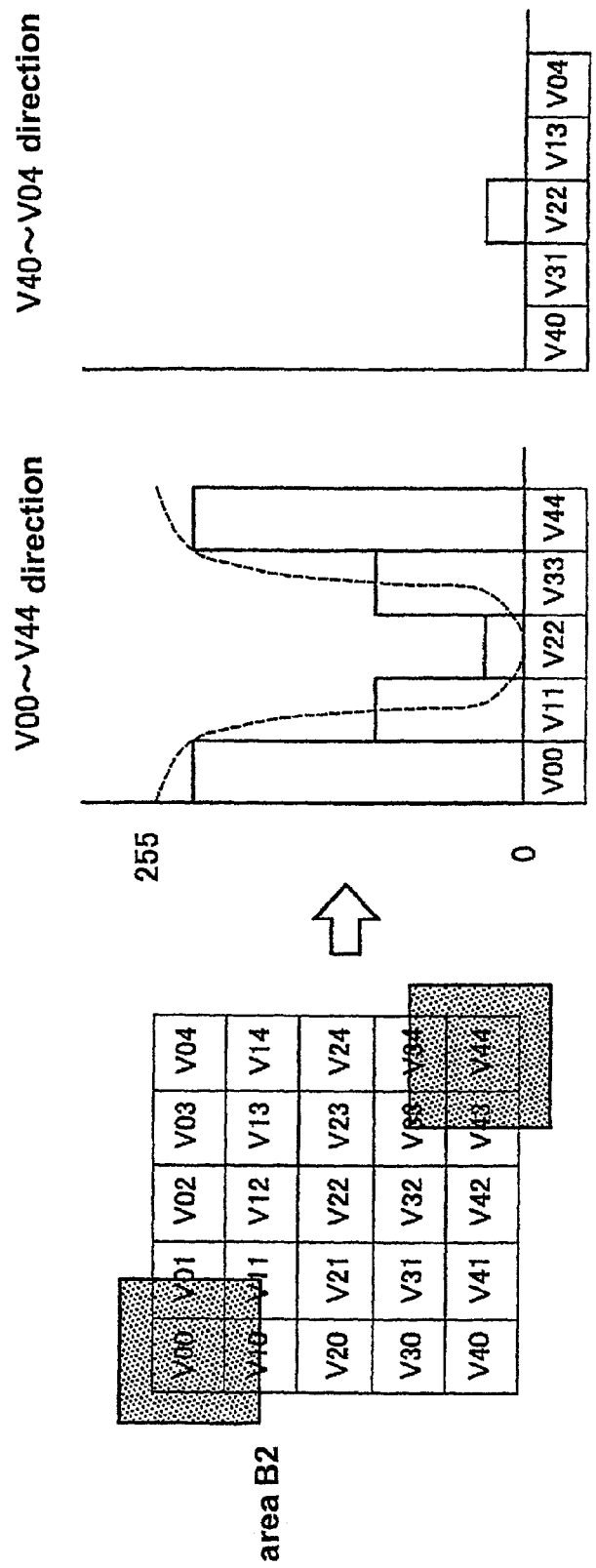
FIG. 17 is a drawing showing the density value of each pixel in two different directions in the area B2 of FIG. 15 (crossing point detection).

Here, in a 9 by 20 matrix, a maximum of 25 black or white isolated points may be detected, as shown in FIG. 13, for example, but a maximum of 50 crossing points may be detected, as shown in FIG. 14. By detecting crossing points as dot characteristic points in a prescribed area in which dot characteristic points are counted in this way, a larger number of dot characteristic points may be detected.

When the counting of crossing points by the α-angle and β-angle crossing point counting units 44 and 45 is completed, the results of the counting are input to the dot determining unit 46. The comparator 51 determines whether or not the count value for α-angle crossing points exceeds the threshold value TH1, the comparator 52 determines whether or not the count value for β-angle crossing points exceeds the threshold value TH2, and the comparator 53 determines whether or not the sum of the count values for α-angle and β-angle crossing points exceeds the threshold value TH3. Each comparator 51 through 53 outputs a dot signal when the input value exceeds the threshold value, and outputs a non-dot signal when the input value does not exceed the threshold value.

The outputs from the comparators 51 through 53 are input to the OR circuit 54. Where any one of the signals input to the OR circuit 54 is a dot signal, the OR circuit outputs a dot signal. In other words, the dot determining unit 46 determines that the target pixel belongs to a dot area. On the other hand, where all of the outputs from the comparators 51 through 53 are non-dot signals, the OR circuit 54 outputs a non-dot signal. In other words, the dot determining unit 46 determines that the target pixel belongs to a non-dot area.

The result of determination by the dot determining unit 46 is input to the terminal S of the selecting unit 34, which is included in the MTF correction unit 23. The selecting unit 34 selects for the image data determined to belong to a dot area the image that has been processed by the smoothing unit 32, and selects for the image data determined to belong to a non-dot area image data that has been processed by the edge enhancement unit 31. An image is then formed on the recording medium based on the image data selected in these processes.

As described in detail above, according to the copying machine pertaining to the first embodiment, the dot characteristic point detecting unit 40 detects not isolated points but crossing points. Consequently, even with a high-resolution image in which detection of isolated points is difficult, crossing points may be detected as dot characteristic points with superior accuracy. In addition, in the same detection area, more crossing points may be detected than isolated points. Furthermore, image noise and letter images are not erroneously determined to be crossing points. Moreover, because the dot characteristic point detecting unit 40 detects α-angle and β-angle crossing points, crossing points can be detected with superior accuracy in a color dot image as well. Because the accuracy of dot characteristic point detection increases as described above, dot area determination may be carried out with superior accuracy.

Second Embodiment

A second embodiment will now be explained. A copying machine pertaining to the second embodiment has essentially the same basic construction as the copying machine pertaining to the first embodiment, excluding the construction of the dot determining unit included in the MTF correction unit. Therefore, explanation of identical components will not be repeated, and only differences will be explained.

Figure 7:
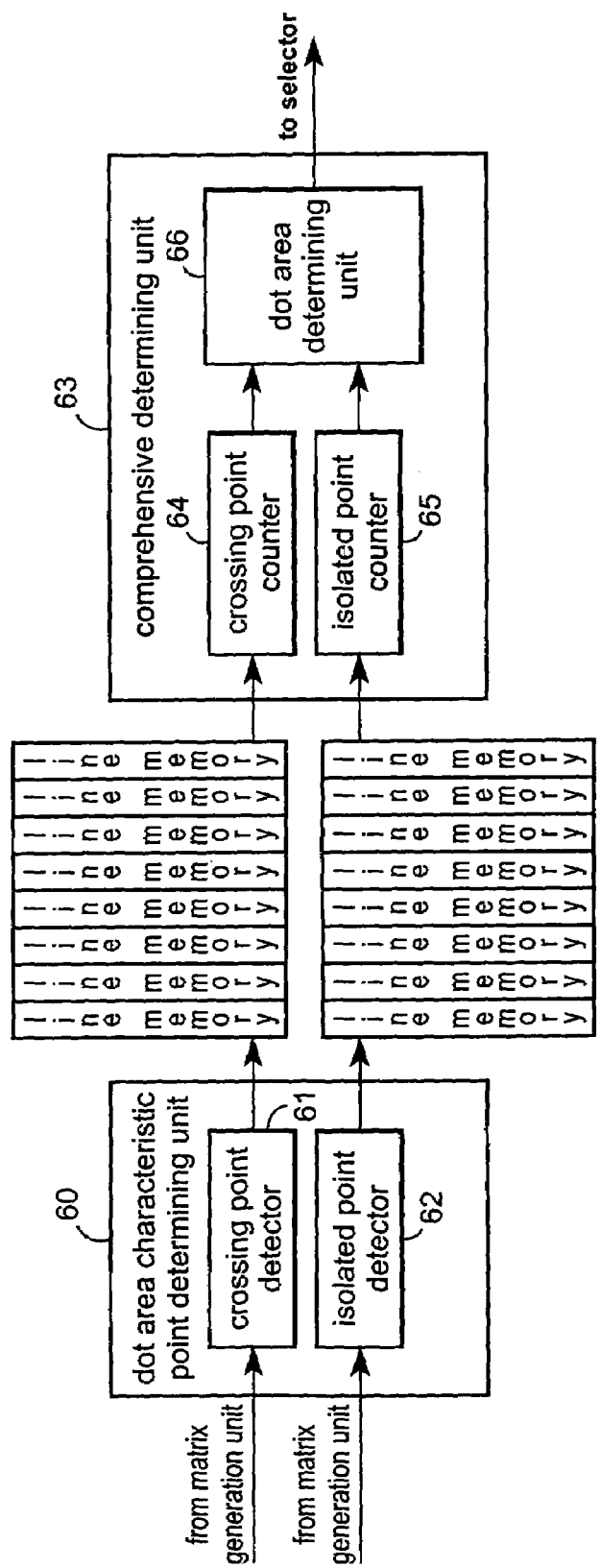
FIG. 7 is a block diagram shown in a summary fashion a dot determining unit in the digital copying machine pertaining to a second embodiment.

FIG. 7 shows in a summary fashion the construction of the dot determining unit in this embodiment. In the dot determining unit of this embodiment, in contrast to the first embodiment, the dot characteristic point detecting unit 60 includes an isolated point detecting unit 62 that detects isolated points. At the same time, the comprehensive determination unit 63 includes an isolated point counting unit 65 to count the number of isolated points that exist in a prescribed area. The dot characteristic point detecting unit 60 also includes a crossing point detecting unit 61 which detects α-angle crossing points as explained in connection with the first embodiment. Naturally, it is acceptable if the crossing point detecting unit 61 detects crossing points for screen angles other than the α-angle. It is also acceptable if multiple types of crossing points for different screen angles are detected. However, where multiple types of crossing points are detected, line memories and crossing point counting units must be newly added.

In a dot image having a low dot density, detection of crossing points may become difficult, while the accuracy of isolated point detection increases. Therefore, if only crossing points are detected as dot characteristic points, depending on the type of the dot image, the accuracy in dot characteristic point detection may decrease. Consequently, as in this embodiment, if a crossing point detecting unit 61 and an isolated point detecting unit 62 are included in the dot characteristic point detecting unit 60 such that crossing points and isolated points are detected as dot characteristic points, dot characteristic points in all types of dot images may be detected with superior accuracy. Therefore, dot characteristic point detection accuracy increases, resulting in accurate dot area determination.

Third Embodiment

Finally, a third embodiment will be explained. A copying machine pertaining to the third embodiment also has the same basic construction as the copying machine pertaining to the first and second embodiments, and differs only in regard to the construction of the dot determining unit included in the MTF correction unit. Again, explanation of identical components will not be repeated, and only differences will be explained.

Figure 8:
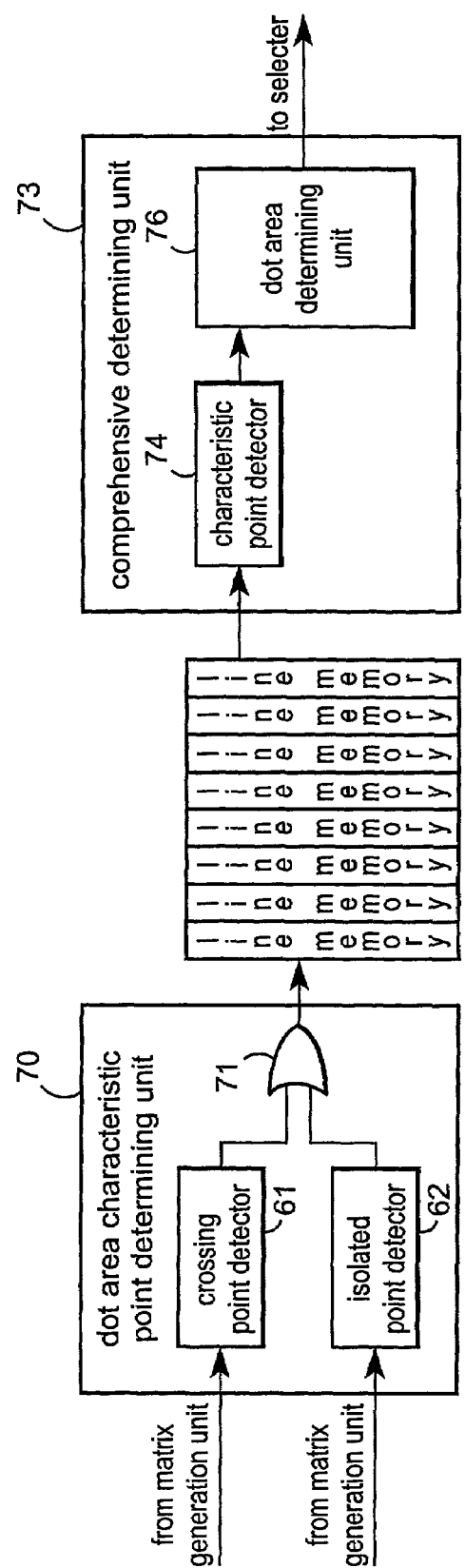
FIG. 8 is a block diagram showing in a summary fashion the construction of the dot determining unit in the digital copying machine pertaining to a third embodiment.

FIG. 8 shows in a summary fashion the construction of the dot determining unit in this embodiment. As in the second embodiment, the dot characteristic point detecting unit 70 includes a crossing point detecting unit 61 and an isolated point detecting unit 62, as well as an OR circuit 71. By including an OR circuit 71 in the dot characteristic point detecting unit 70, the logical sum of the result of detection by the crossing point detecting unit 61 and the result of detection by the isolated point detecting unit 62 may be calculated so that the dot characteristic point detecting unit 70 has a single output. Consequently, the number of line memories may be reduced, and the construction of the comprehensive determination unit 73 also becomes simplified. In other words, even though both crossing points and isolated points are detected as dot characteristic points, only one characteristic point counting unit 74 is needed as the dot characteristic point counting means, and the dot determining unit 76 can consist of a single comparator.

The embodiments described above are merely examples, and do not limit the present invention in any way. Naturally, various improvements and modifications are possible within the essential scope of the invention. For example, explanations were given for the above embodiments using a situation in which the invention was applied in a digital copying machine, but the present invention may be applied in other types of copying machines, printers or facsimile machines. In addition, needless to say, the specific values (such as the matrix size, for example) used in the above embodiments are mere examples.

As described above, according to these embodiments, an image processing apparatus can be provided that enables accurate determination of dot areas when the resolution of the image increases.

Although the present invention has been described in connection with exemplary embodiments thereof, it will be appreciated by those skilled in the art that additions, deletions, modifications, and substitutions not specifically described may be made without departing from the spirit and scope of the invention as defined in the appended claims.

What is claimed is:

1. An image processing apparatus, comprising:
a dot characteristic point detector for detecting a crossing point that has a largest density value among pixels aligned in one direction and a smallest density value among pixels aligned in another direction, said directions being perpendicular to each other;
an attribute determinor for determining a dot area of an image based on a detection result of the dot characteristic point detecting means; and
a switch that switches image data processing methods based on a result of a determination by the attribute determinor.

2. The apparatus of claim 1, wherein the attribute determinor determines a dot area based on a distribution of dot characteristic points.

3. The apparatus of claim 1, wherein the switch selects an image data processing method that will reduce generation of moire.

4. An image processing apparatus, comprising:
a dot characteristic point detector for detecting crossing points as dot characteristic points;
a dot characteristic point counter for counting a number of dot characteristic points detected by the dot characteristic point detector, and which exist in a prescribed area including a target pixel;
an attribute determinor for determining whether or not the target pixel belongs to a dot area by comparing a result of counting by the dot characteristic point counter with a prescribed threshold value; and
a switch for switching image data processing methods based on a determination of the attribute determinor.

5. The apparatus of claim 4, wherein the dot characteristic point detector includes a device for detecting crossing points.

6. The apparatus of claim 4, wherein the device for detecting crossing points determines which pixel, among a plurality of pixels aligned in one direction, has a largest density value among the pixels aligned in the one direction and determines which pixel, among a plurality of pixels aligned in another direction, has a smallest density value among the pixels aligned in the another direction.

7. The apparatus of claim 4, wherein the switch selects an image data processing method that will reduce generation of moire.

8. The apparatus of claim 4, wherein the dot characteristic point detector detects multiple types of crossing points by using detection patterns having different crossing angles.

9. The apparatus of claim 4, wherein the dot characteristic point counter separately counts a number of each type of crossing point that is detected by the dot characteristic point detector.

10. The apparatus of claim 4, wherein the attribute determinor determines whether or not the target pixel belongs to a dot area by comparing a result of counting for each type of crossing points by the dot characteristic point counter with a prescribed threshold value.

11. The apparatus of claim 4, wherein the dot characteristic point detector further detects as dot characteristic points isolated points that have a density difference relative to its surrounding pixels that exceeds a prescribed value.

12. The apparatus of claim 11, wherein the dot characteristic point counter separately counts a number of crossing points and a number of isolated points, both of which are detected by the dot characteristic point detector.

13. The apparatus of claim 12, wherein the attribute determinor determines whether or not a target pixel belongs to a dot area by comparing each result of counting by the dot characteristic point counter with a prescribed threshold value.

14. The apparatus of claim 11, wherein the dot characteristic point detector may output as dot characteristic points an OR calculation result regarding the crossing points and the isolated points detected by the dot characteristic point detector.

15. An image processing apparatus, comprising:
a dot characteristic point detector for detecting a target pixel that has a largest density value among a plurality of pixels that are aligned on a continuous basis in a first direction and has a smallest density value among a plurality of pixels that are aligned on a continuous basis in a second direction;
an attribute determinor for determining a dot area in the image based on a result of detection by the dot characteristic point detector; and
a switch for switching image data processing methods based on a result of determination by the attribute determinor.

16. An image processing method, comprising:
detecting a crossing point that has a largest density value among pixels aligned in one direction and a smallest density value among pixels aligned in another direction, said directions being perpendicular to each other;
determining a dot area of an image based on a detection of crossing points; and
switching image data processing methods based on a result of a determination of a dot area.

17. The method of claim 16, wherein a dot area is determined based on a distribution of dot characteristic points.

18. The method of claim 16, wherein the image data processing method is selected that will reduce generation of moire.

19. An image processing method, comprising:
identifying crossing points as dot characteristic points;
counting a number of identified dot characteristic points which exist in a prescribed area including a target pixel;
determining whether or not the target pixel belongs to a dot area by comparing the number of identified dot characteristic points with a prescribed threshold value; and
switching image data processing methods based on whether the target pixel belongs to a dot area.

20. The method of claim 19, wherein the identifying step includes detecting crossing points.

21. The method of claim 19, wherein the crossing point detecting step determines which pixel, among a plurality of pixels aligned in one direction, has a largest density value among the pixels aligned in the one direction and determines which pixel, among a plurality of pixels aligned in another direction, has a smallest density value among the pixels aligned in the another direction.

22. The method of claim 19, wherein an image data processing method is selected that will reduce generation of moire.

23. The method of claim 19, wherein the identifying step detects multiple types of crossing points by using detection patterns having different crossing angles.

24. The method of claim 23, wherein the counting step includes separately counts a number of each type of crossing point that is detected.

25. The method of claim 19, wherein the counting step separately counts a number of crossing points and a number of isolated points.

26. An image processing method, comprising:

detecting a target pixel that has a largest density value among a plurality of pixels that are aligned on a continuous basis in a first direction and has a smallest density value among a plurality of pixels that are aligned on a continuous basis in a second direction;

determining a dot area in the image based on a result of the detecting step; and switching image data processing methods based on a result of the determinating step.

* * * * *